US011356846B2

(12) United States Patent
Osborn et al.

(10) Patent No.: US 11,356,846 B2
(45) Date of Patent: *Jun. 7, 2022

(54) METHOD AND SYSTEM FOR LOCALIZING AND IDENTIFYING MOBILE DEVICE USING SHORT-RANGE MESH NETWORK NODES

(71) Applicant: Capital One Services, LLC, McLean, VA (US)

(72) Inventors: Kevin Osborn, Newton, MA (US); David Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/703,130

(22) Filed: Dec. 4, 2019

(65) Prior Publication Data

US 2020/0280853 A1 Sep. 3, 2020

Related U.S. Application Data

(63) Continuation of application No. 16/288,757, filed on Feb. 28, 2019, now Pat. No. 10,531,299.

(51) Int. Cl.
| | |
|---|---|
| *H04W 12/06* | (2021.01) |
| *H04W 16/28* | (2009.01) |
| *H04B 17/318* | (2015.01) |
| *G07F 19/00* | (2006.01) |
| *H04W 24/10* | (2009.01) |
| *H04W 84/18* | (2009.01) |

(52) U.S. Cl.
CPC ............ *H04W 12/06* (2013.01); *G07F 19/20* (2013.01); *H04B 17/318* (2015.01); *H04W 16/28* (2013.01); *H04W 24/10* (2013.01); *H04W 84/18* (2013.01)

(58) Field of Classification Search
CPC ............................... H04W 4/02; H04W 84/18
See application file for complete search history.

(56) References Cited

U.S. PATENT DOCUMENTS

| | | | | |
|---|---|---|---|---|
| 6,218,953 B1* | 4/2001 | Petite | ................... | G08B 21/182 |
| | | | | 340/521 |
| 2004/0257274 A1* | 12/2004 | Benco | ................... | G01S 5/0263 |
| | | | | 379/88.19 |
| 2007/0140127 A1* | 6/2007 | Frei | ....................... | H04J 3/0655 |
| | | | | 370/473 |
| 2007/0206538 A1* | 9/2007 | Mizukoshi | ............ | H04W 40/36 |
| | | | | 370/331 |

(Continued)

*Primary Examiner* — Zhiren Qin
(74) *Attorney, Agent, or Firm* — KDB

(57) ABSTRACT

Various embodiments are directed to localizing and identifying a mobile computing device using a short-range mesh network. A user of the mobile computing device may be authenticated. When the mobile computing device connects to the mesh network, the location of the mobile computing device may be determined by determining which mesh network nodes the mobile computing device is connected to, triangulating the position of the mobile computing device based on signal direction via directional antennas arranged on the mesh network nodes, and/or measuring signal strength of the mobile computing device at the mesh network nodes.

20 Claims, 8 Drawing Sheets

(56) References Cited

U.S. PATENT DOCUMENTS

| | | | |
|---|---|---|---|
| 2015/0072628 A1* | 3/2015 | Mackie | H04L 65/00 |
| | | | 455/77 |
| 2016/0086143 A1* | 3/2016 | Hao | G06Q 20/4097 |
| | | | 705/43 |
| 2018/0103342 A1* | 4/2018 | Taylor | H04W 40/246 |
| 2019/0090275 A1* | 3/2019 | Zhang | H04W 74/0816 |

* cited by examiner

100

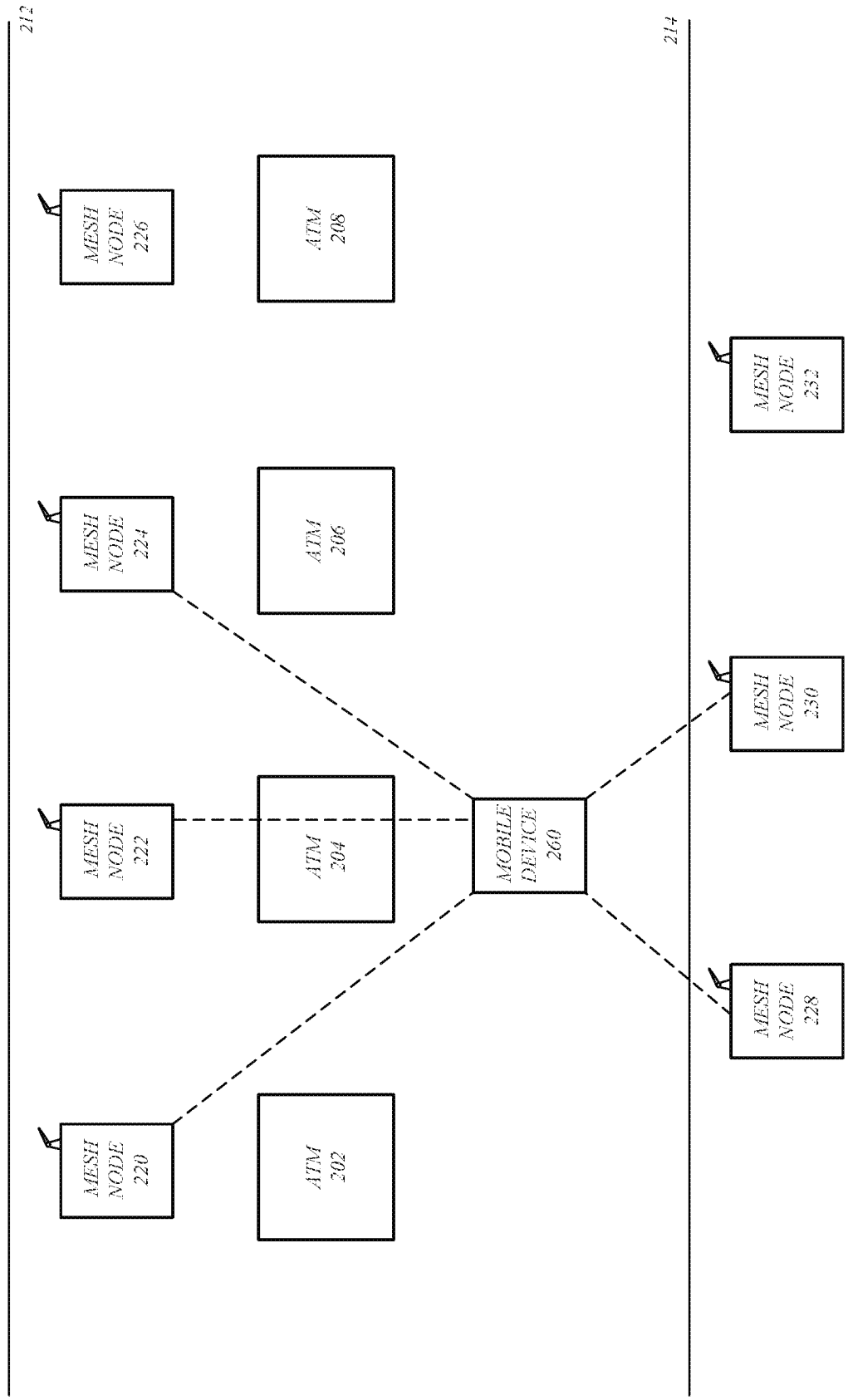

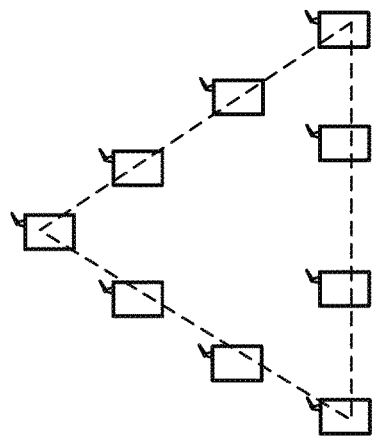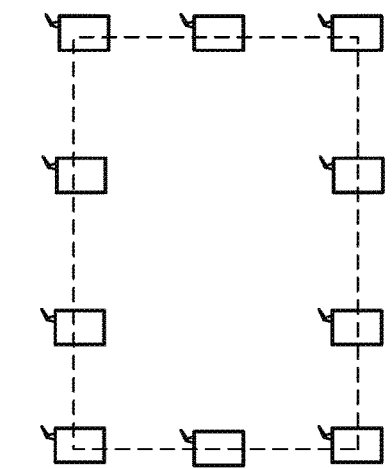
FIG. 3A  310
FIG. 3B  320
FIG. 3C  330

METHOD AND SYSTEM FOR LOCALIZING AND IDENTIFYING MOBILE DEVICE USING SHORT-RANGE MESH NETWORK NODES

RELATED APPLICATION

This application is a continuation of U.S. patent application Ser. No. 16/288,757, titled "METHOD AND SYSTEM FOR LOCALIZING AND IDENTIFYING MOBILE DEVICE USING SHORT-RANGE MESH NETWORK NODES" filed on Feb. 28, 2019. The contents of the aforementioned application are incorporated herein by reference.

BACKGROUND

Location based services (LBS) may be services that are offered to a user through the user's mobile phone based on its geographical location. Typically, LBS provide information, entertainment, services, or the like that are near or around the geographical location. Because LBS are largely dependent on the user's location, the primary objective of LBS may be determine where the user is located based on the geographical location of the user's mobile phone.

To locate the user, one method may involve using the mobile phone network to identify the base transceiver station (BTS) that the phone is currently communicating with and subsequently pinpoint the location of the BTS. Other methods to locate the user may involve using GPS-based systems and the built-in GPS receiver in the user's phone. Another method may be to use short-range beacons that employ Wi-Fi or Bluetooth technologies.

In the above described methods, however, locating the mobile phone's precise location is extremely difficult, and often, not the primary objective since determining the general geographical location of the phone is sufficient to offer nearby services to the user. Thus, problems may occur in situations or use cases where location precision is required, for instance, providing a financial service for a specific user at a machine located in a specific geographical location that is crowded with other users. Accordingly, there is a need to wirelessly identify and localize that specific user with high accuracy and reliability to provide or perform various services.

SUMMARY

Various embodiments are generally directed to localizing and identifying a mobile computing device using a short-range mesh network. A user of the mobile computing device may be authenticated. When the mobile computing device connects to the mesh network, the location of the mobile computing device may be determined by determining which mesh network nodes the mobile computing device is connected to, triangulating the position of the mobile computing device based on signal direction via directional antennas arranged on the mesh network nodes, and/or measuring signal strength of the mobile computing device at the mesh network nodes.

BRIEF DESCRIPTION OF THE DRAWINGS

FIG. 2 illustrates another example of a system in accordance with one or more embodiments.

FIG. 3A illustrates an example rectangular configuration of mesh network nodes in accordance with one or more embodiments.

FIG. 3B illustrates an example circular configuration of mesh network nodes in accordance with one or more embodiments.

FIG. 3C illustrates an example triangular configuration of mesh network nodes in accordance with one or more embodiments.

DETAILED DESCRIPTION

Figure 1:
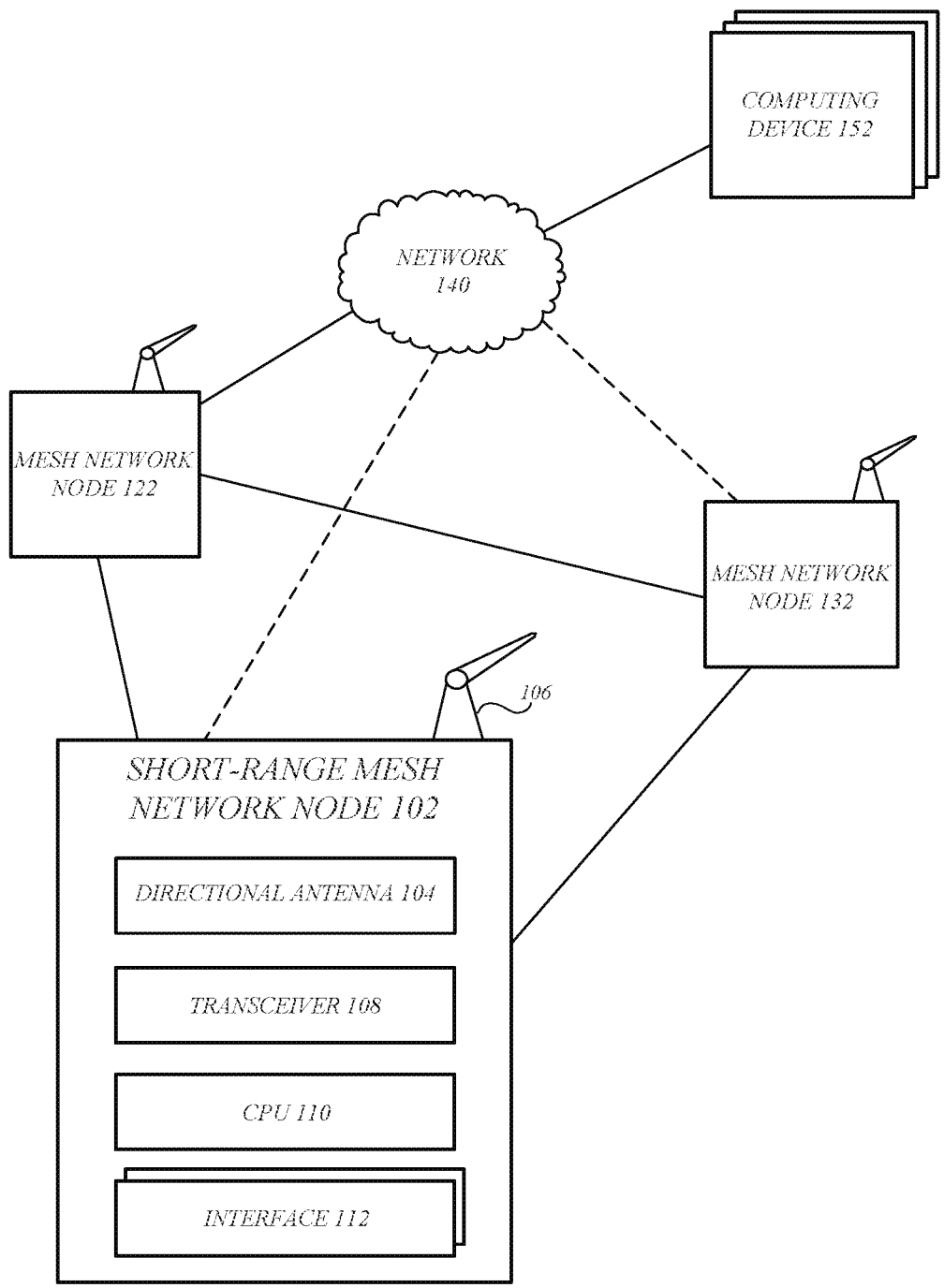
FIG. 1 illustrates an example system in accordance with one or more embodiments.

Various embodiments are generally directed to a method and system for localizing and identifying a mobile computing device, such as a smartphone, using one or more short-range mesh network nodes (hereinafter referred to as mesh nodes) of a mesh network. In examples, the mesh network may be configured indoors (e.g., a building, a room, enclosed space) and/or outdoors (e.g., a concert venue, a sports venue). When the mobile computing device connects to the mesh network, the precise location of the mobile computing device may be determined based on one or a combination of factors, such as identifying one or more known locations of fixed mesh nodes that the mobile computing device may be connected to, calculating one or more triangulations of signal direction, assessing one or more signal strengths of the mobile computing device detected by the mesh nodes, acquiring GPS or other location-based data from other mobile computing devices connected to the mesh network, and the like. In at least that regard, services that are based on, or require, the precise location of a user can be provided.

In embodiments, at least one mesh node of the mesh network may be configured to be fixed or stationary, where the location of this node may be known, e.g., based on the known topology of the fixed mesh nodes. Moreover, at least one mesh node may be configured to be mobile and able to freely connect and disconnect from the mesh network at any time. An example of a mobile mesh node may be the mobile computing device belonging to the user, which may be, for instance, a smartphone, a laptop, etc. One or more of the fixed and the mobile mesh network nodes may include one or more directional antennas and a transmitter for triangulating the position of other nodes in the mesh network and measuring signal strength of those nodes.

According to examples, the mesh nodes may be arranged in various configurations, e.g., rectangular, circular, triangular, polygonal, etc. The configurations may be selected based on different factors, such as the physical layout of the environment in which the mesh network is arranged, the size of the environment, how the mesh network is being used or applied (e.g., for a specific service, application, or use case), etc. For instance, if the service involves determining the precise location of a specific user relative to a device, then arranging or clustering more mesh nodes (fixed, mobile, or otherwise) around the device may improve the localization of the smartphone belonging to that user. In another instance, if the service involves determining whether a specific user is within a demarcated zone, then arranging the mesh nodes around or in the shape of the zone may improve the localization of that user.

In examples, the above-described device may be an automated teller machine (ATM). In this use case, for instance, a user may be able to securely authenticate on a banking application and select a transaction to be performed (e.g., withdraw cash) on the user's smartphone. The user may then go to a building or an enclosed space containing one or more of the banking institution's ATMs, where one or more mesh networks are configured therein. Using the mesh network(s), the user can be identified, and when it is determined that the user (via the smartphone) is within a certain distance from an ATM, that ATM may perform the transaction that was previously specified by the user. To at least that end, the user may be identified and localized prior to, or as, the user approaches the ATM. It may be understood that the device may not be limited to an ATM, but may be any other suitable device, such as a kiosk, a vending machine, a gas pump, a security checkpoint device, etc.

In further examples, the above-described demarcated zone may be used for security services, such as in airports, and/or ticketing services, such as in concert venues, or the like. A user, for instance, may check-in and authenticate using a smartphone application prior to user's arrival at the airport or the concert venue. Upon the user's arrival, the user may be identified and localized using one or more mesh networks arranged within the airport or concert venue, specifically near or around the demarcated zone. When it is determined that the user (via the smartphone) has entered and is within the demarcated zone, the user may be allowed to enter certain areas of the airport (e.g., gates), or may be able to enter the concert venue. In at least this regard, the correct user can be quickly identified and localized (amongst numerous users) to facilitate these types of security or ticketing-based services or use cases.

Previous solutions merely implement wireless protocols that are too long range and high range to identify a user's exact location relative to a specific device, machine, or area, and further, attempting to determine location from signal strength alone may be unreliable due to unwanted reflections, noise, and antenna orientation of the user's mobile device. The various embodiments and examples described herein overcome these problems by utilizing a mesh network having mesh network nodes configured with directional antennas to localize and identify the user's mobile computing device with precision. Thus, it is possible to provide services or transactions that require picking out or identifying a specific user at a specific location and at a specific time (assuming that the user has been authenticated) so as to verify that the user is actually the user relative to a fixed location.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example short-range mesh system 100 according to one or more embodiments. As shown, the mesh system 100 includes at least a short-range mesh network node 102, a mesh network node 122, and mesh network node 132. The short-range mesh network node 102 may include various components therein, such as a directional antenna 104 (which may be configured internally), a directional antenna 106 (arranged externally), a transceiver 108, a central processing unit (CPU) 110, and at least one interface 112. The mesh network nodes 122 and 132 may be configured similarly to the short-range mesh network node 102.

The directional antennas 104 and 106 may be antennas that radiate or receive greater power in specific directions thereby allowing increased performance and reduced interference from unwanted sources. Moreover, the directional antennas allow the mesh nodes to determine the direction of the signal source and/or take signal direction measurements, and thus, triangulate the position of the source. The transceiver 108 may be any device (conventional or otherwise) that can both transmit and receive communication. The CPU 110 may be any processor that can carry out or execute computer programs based on the instructions thereof. Interface 112 may be a device or a program that enables the short-range mesh network node 102 to interact with other nodes or other computing devices. For example, the interface 112 may be a network interface card (NIC), a network car, an adapter, or any other computer hardware component that allows and facilitates communication with other network components.

By way of example, at least the short-range mesh network node 102, the mesh network node 122, and the mesh network node 132 may be interconnected wirelessly or by wireline (as shown by the solid lines) to form a mesh network. Thus, the mesh network nodes connect directly, dynamically, and/or non-hierarchically, and communicate to route data amongst each other. It may be understood that the topology of the mesh network may increase in complexity as additional mesh nodes are added to the network.

One or more of the nodes of the mesh network may connect to the network 140. As illustrated, mesh network node 122 is connected to the network 140 (shown by the solid line). Optionally, the short-range mesh network node 102 and the mesh network node 132 may connect to the network 140 (shown by the dashed lines). Network 140 may be a local network or an external network, such as the Internet. A computing device 152 may also connect to the network 140 and may communicate with the mesh network. For example, the computing device 152 may be a backend server computer that provides or facilitates a service for a user. Accordingly, the computing device 152 may receive from and transmit data to the mesh network over the network 140.

In embodiments, the short-range mesh network node 102, the mesh network node 122, and the mesh network node 132 may all be fixed nodes, and the physical locations of the nodes in the mesh network topology may be known and communicated with each other. As will be further described below, when a mobile node, such as a mobile computing device, connects to the mesh network, the location of the mobile computing device can be determined, and further, the location of the mobile computing device relative to an object (e.g., an ATM) can be determined based on the known positions of the fixed nodes relative to the position of the object (which can also be communicated among the nodes). For example, the location may be determined based on which of the mesh nodes the mobile computing device is connected. In another example, the mesh nodes may triangulate the location of the mobile computing device using the directional antennas. In yet another example, the location may be determined based on signal strength of the mobile computing device at the mesh network nodes. It may be understood that the short-range mesh network node 102, the mesh network node 122, the mesh network node 132, and the computing device 152, either individually or collectively, in various combinations, may orchestrate the localization of the mobile computing device.

FIG. 2 illustrates another example of a short-range mesh system 200 according to one or more embodiments. As shown, the short-range mesh system 200 may be implemented in a building, such as a bank, and includes four different ATMs: ATM 202, ATM 204, ATM 206, and ATM 208, and further includes a mesh network formed by at least seven different mesh nodes: mesh node 220, mesh node 222, mesh node 224, and mesh node 226—all of which are installed adjacent to or on ceiling 212—and mesh node 228, mesh node 230, and mesh node 232—all of which are installed on or under floor 214. All the mesh nodes may be fixed and their locations, including specific positions, in the building and their positions relative to each ATM may be known.

For example, mesh node 220 may be arranged directly above ATM 202, as illustrated. Similarly, mesh node 222 may be arranged directly above ATM 204, mesh node 224 may be arranged directly above ATM 206, and mesh node 226 may be arranged directly above ATM 208. Moreover, as shown, mesh node 228 may be positioned between ATMs 202 and 204, mesh node 230 may be positioned between ATMs 204 and 206, and mesh node 232 may be positioned between ATMs 206 and 208. In examples, the exact distances between each mesh node and the exact distances between each mesh node and the ATMs may be known.

It may be understood that the mesh nodes 220, 222, 224, 226, 228, 230, and 232 may each be configured similarly to the short-range mesh network node 102 illustrated in FIG. 1. Thus, each mesh node may include at least one directional antenna and a transceiver. Further, it may be understood that the mesh nodes may be configured to communicate amongst each other as well as other computing devices, such as backend server computers, that may be connected to the mesh network.

By way of example, a user may use the user's mobile device 260, e.g., smartphone, to open a financial transaction application and securely authenticate the user using the application. The user may request to withdraw money from the user's checking account, the amount for which may be specified through the application. In other examples, the user may request a cashier's check, a certified check, or deposit cash or one or more checks using an ATM. One or more backend server computers, which may be connected to the mesh network, may process this request and may notify or instruct the mesh nodes to locate or localize the user once the mobile device 260 connects to the mesh network. If it is determined that the user is within a specific distance from any one of the ATMs 202, 204, 206, 208, the requested amount of cash may be dispensed from that ATM.

The user may walk into the building, and the mobile device 260 may automatically connect to the mesh network. As illustrated, mobile device 260 may connect to mesh nodes 220, 222, 224, 228, and 230 (shown by the dashed lines), but not to mesh nodes 226 and 232 (e.g., because the mobile device may be too far to establish a connection). Thus, based on which mesh nodes the mobile device 260 connects to, the mobile device 260 may be localized to a specific area in the building, e.g., the area near ATMs 202, 204, and 206. Thus, it can be determined that the user is not standing near ATMs 206 and 208. It may be understood that in some examples, the precise location of the user may be determined based on the connection of the mobile device 260 to the mesh nodes alone.

To determine which ATM the user is standing closest to, two or more of the mesh nodes 220, 222, 224, 228, and 230 may triangulate the exact location of the user via the directional antennas. For example, the directional antennas of the mesh nodes 220 and 222 may be used to determine the directions of the received signals from the mobile device 260 and further determine where those directions intersect. This triangulation technique may also be used by other various combinations of mesh nodes, e.g., mesh nodes 220 and 224, mesh nodes 222 and 224, mesh nodes 228 and 230, mesh nodes 220 and 228, mesh nodes 222 and 228, etc. Based on the triangulation of the signal directions, it may be determined that mobile device 260 is located nearest to ATM 204.

Additionally, signal strengths from the mobile device 260 measured at the mesh nodes 220, 222, 224, 228, and 230 may be used to determine the location of the user. As shown, the signal strength of the mobile device 260 at mesh nodes 222, 228, and 230 are the greatest, and in combination with signal direction, the mobile device 260 can be localized to being in front of or closest to ATM 204. Accordingly, ATM 204 may perform the transaction for the user and output cash. In at least that way, advantageously, the user is not required to interact with the ATM itself, e.g., insert a debit card, specify cash withdrawal amount, etc. Rather, the mesh system 200 is already aware of the desired transaction and automatically performs that transaction when the user approaches an ATM.

According to embodiments, the ATMs 202, 204, 206, and 208 may not be configured with screens and may not require the user having to physically contact the ATM in some form (e.g., inserting a card therein, tapping a contactless plate, etc.). According to further embodiments, the ATMs are not required to have a connection to the Internet since the ATMs can be configured to connect to one or more of the mesh network nodes to connect to the Internet.

FIGS. 3A to 3C illustrate example configurations of mesh network nodes according to one or more embodiments. As shown in FIG. 3A, the mesh network nodes (which may be configured similarly to the short-range mesh network node 102 of FIG. 1) may be arranged in a rectangular configuration 310. As described above, the configuration of the mesh network nodes may depend on the physical layout of the environment or how to best locate or localize a mobile computing device in the environment.

FIG. 3B illustrates eight mesh network nodes arranged in a circular, oval, or ring configuration 320. The mesh network nodes, in this configuration, may be arranged or installed near the ceiling of a building, for example, or the nodes may be arranged below the floor of the building, or in some examples, may be arranged in both the ceiling and the floor of the building. Similarly, FIG. 3C shows nine mesh network nodes arranged in a triangular configuration 330. It may be understood that the mesh network node configurations are not limited to the rectangular, circular, and triangular configurations 310, 320, and 330, respectively, but may include any other suitable configuration in a shape that is polygonal, and/or the nodes may be arranged on different planes or levels.

Figure 4:
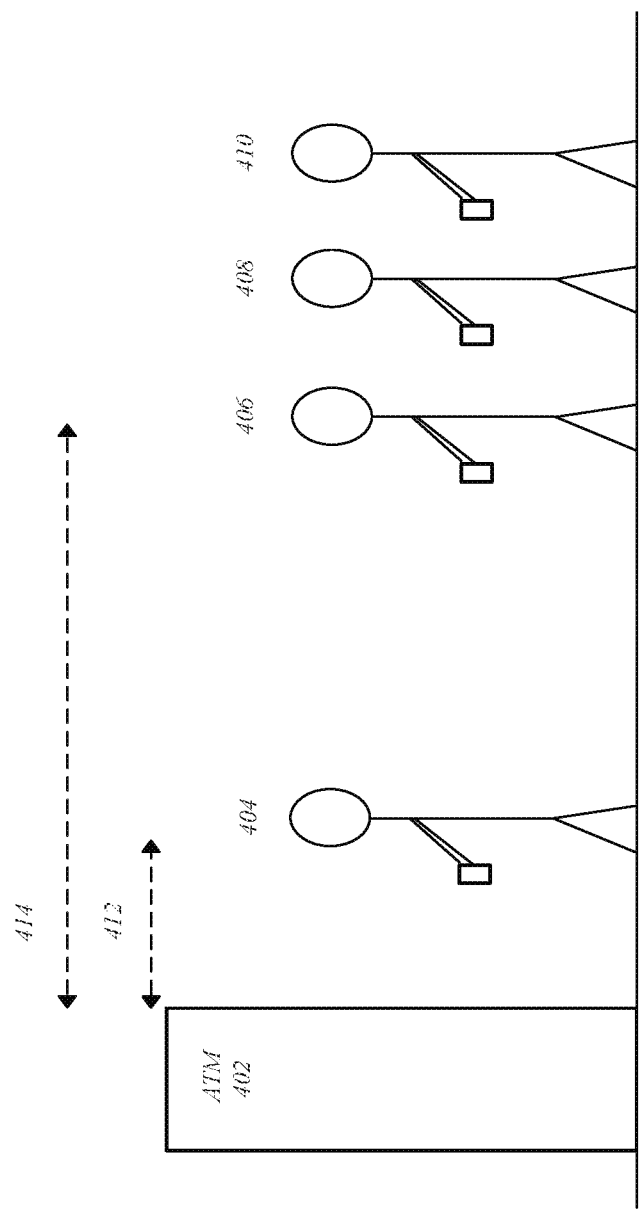
FIG. 4 illustrates an example predetermined distance from a device in accordance with one or more embodiments.

FIG. 4 illustrates an example predetermined distance from a device according to one or more embodiments. As shown, the device may be an ATM, e.g., ATM 402. But, it may be understood that the device may be any other type of device or machine, transaction-based or otherwise, such as a kiosk, a vending machine, a gas pump, a security checkpoint device, etc. Referring back to FIG. 2, there may be situations where multiple users may connect to the mesh network to complete their transactions at an ATM. In at least that regard, a predetermined distance from the ATM may be established, such that when a specific mobile computing device is located within or at the predetermined distance, only then will the ATM perform the transaction for the user.

As shown in FIG. 4, there may be multiple users, e.g., users 404, 406, 408, and 410, near or around the ATM 402 waiting to retrieve cash or perform other transactions. User 404's mobile computing device may be located within a predetermined distance 412 from the ATM 402, which triggers the ATM 402 to perform a transaction for user 404. The transactions for users 406, 408, and 410, who are located at least a distance 414 away from the ATM 402, are not performed by the ATM 402 (yet) because they are not within or at the predetermined distance 412, and thus, the transactions associated with the users 406, 408, and 410 will not be mistakenly performed for user 404. In embodiments, the predetermined distance may correspond to a distance that signifies the ATM is currently occupied by a user. For instance, the predetermined distance may be three feet or less.

In determining whether a mobile computing device is within the predetermined distance, a mesh network arranged near the ATM 402 may be used. One or more of the mesh nodes of the mesh network may be concentrated and configured near the ATM 402. In some examples, one or more of the mesh nodes may be arranged on the ATM 402 itself. As described above, the relative distance between each mesh node of the mesh network and the ATM may be known so that the mobile computing device can be located when connected to the mesh network based on these known distances (in combination with, for example, the above-described triangulation and signal strength techniques).

Figure 5:
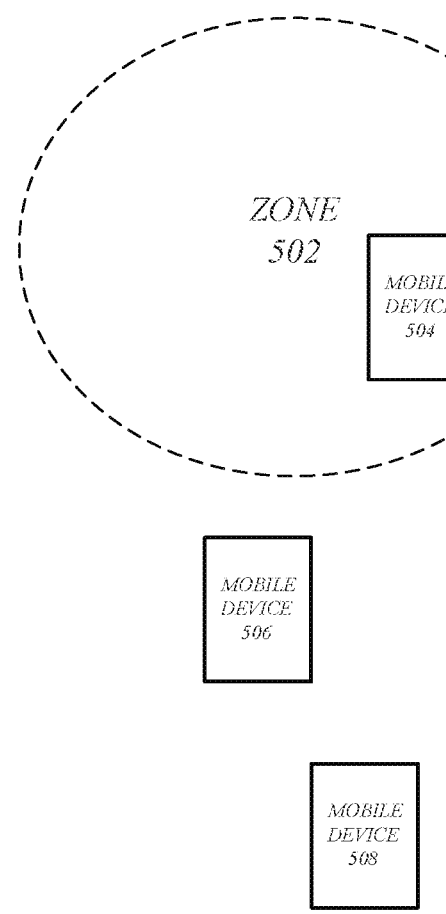
FIG. 5 illustrates an example predefined area in accordance with one or more embodiments.

FIG. 5 illustrates an example predefined area according to one or more embodiments. As shown, the predefined area may be a defined or demarcated zone 502. The demarcated zone 502 may be similar to the predetermined distance 412 described above with respect to FIG. 4 in that a particular transaction or service may be performed when a user (via the user's mobile computing device) is within the zone 502. One or more mesh nodes of a mesh network may be arranged or configured near or around the demarcated zone 502 to determine the location of a mobile computing device, such as mobile device 504, mobile device 506, and mobile device 508.

In embodiments, the zone 502 may be established a security checkpoint, for instance, at an airport. A user may perform an authentication procedure using the user's mobile device 504 and when it is determined that the mobile device 504 has entered the demarcated zone 502, as shown, the user may be allowed to enter various areas of the airport normally restricted to non-passengers (e.g., gates). A similar approach may be applied to concert venues where a user may check-in and authenticate on the user's mobile device 504 and when the mobile device 504 is detected to be within the zone 502, the user is allowed to enter the concert. In another example, the zone 502 may be used for grocery-related services or at checkout lines. The user may purchase groceries or other items using an application, authenticate on the application, and when the user arrives within the zone 502 with the mobile device 504 (thereby verifying that it is indeed the user picking up the groceries), the specific items and grocers may be provided to the user (and not to users with mobile devices 506 and 508).

In at least that way, advantageously, the mesh system arranged near the zone 502 is configured to accurately and quickly locate and verify that the user who requested a specific service or transaction is at the location to complete the service or transaction despite there being many other users near the same location.

Figure 6:
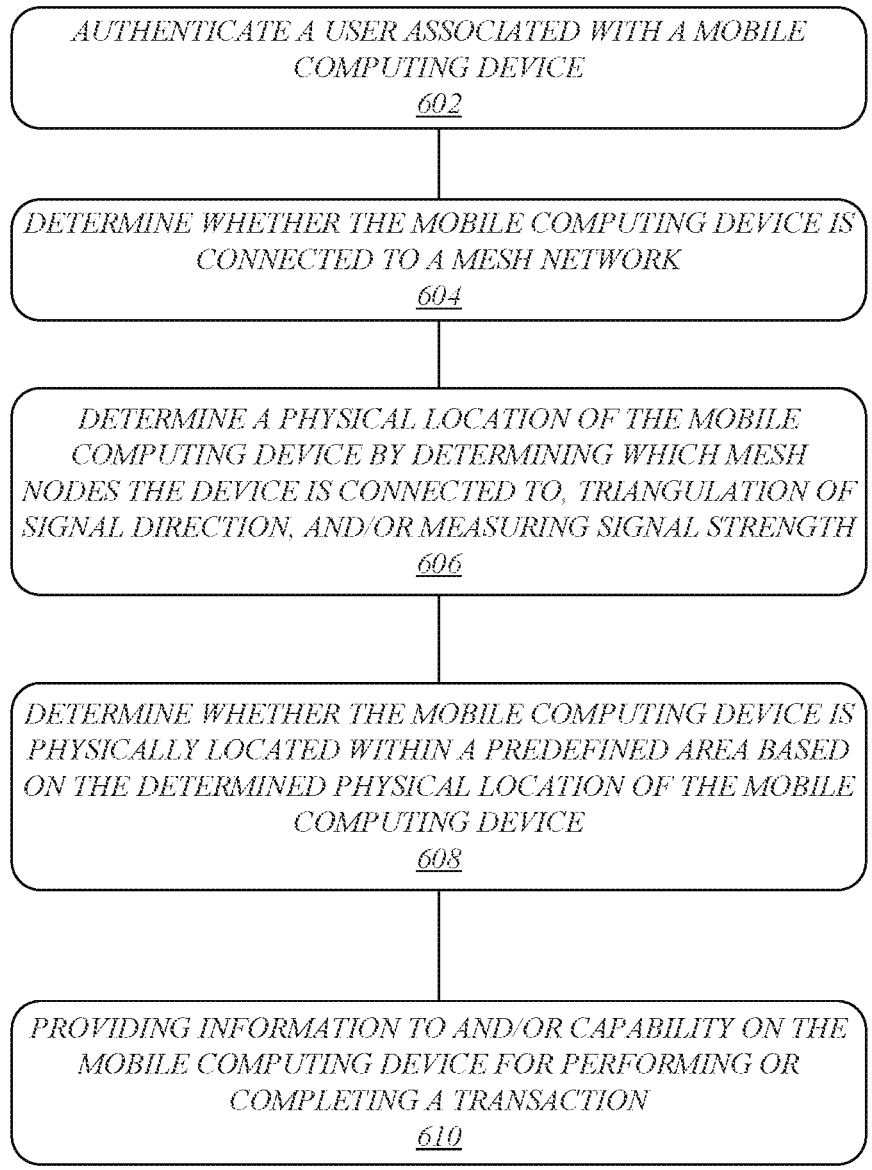
FIG. 6 illustrates an example flow diagram in accordance with one or more embodiments.

FIG. 6 illustrates a flow diagram 600 in accordance with one or more embodiments. It may be understood that the features associated with the illustrated blocks may be performed or executed by one or more computing devices and/or processing circuitry contained therein, such as one or more backend server computers.

At block 602, a user may open a service-based application on the user's mobile computing device, which can be used to authenticate the user. For example, one or more backend server computers may receive authentication data (e.g., birthday, answers to security questions, last four digits of social security number, password, mother's maiden name, PIN number, biometrics, multi-factor authentication, etc.) that the user may enter in the application and verify, based on the received authentication data, that the mobile computing device belongs to the user. In this way, the user may be authenticated prior to connecting to a mesh network.

At block 604, it is determined whether the mobile computing device is connected to a mesh network. As described above, the mesh network may include one or more interconnected mesh network nodes, each of which may include at least one directional antenna and a transceiver. The mesh network may be arranged around, near, or on the physical areas, devices, or machines that perform the particular transaction or service requested by the user. Thus, for example, if the service is a financial transaction to be performed at an ATM, the mesh network may be configured around that ATM. If the service is ticket admission at a concert venue, then the mesh network nodes may be arranged around various ticketing zones, as described above. When the mobile computing device connects to the mesh network, it indicates that the user has arrived at the location that the service or transaction is to be performed.

Upon connecting to the mesh network, the user's mobile computing device may be localized and identified. At block 606, the physical location of the mobile computing device may be determined based on various factors: (i) determining which mesh nodes the mobile computing device is connected to, (ii) determining or measuring the direction of the signals associated with the mobile computing device via the directional antennas configured on the mesh network nodes and triangulating the position of the mobile computing device, and/or (iii) measuring the signal strength of the mobile computing device at the mesh network nodes. As described above, the mesh network nodes may be fixed and positioned at known locations relative to the service-related devices, machines, or the predefined zones or areas. Thus, knowing which mesh network nodes the mobile computing device is connected to may reveal where and how far away the mobile computing device is from the service-related device, machines, predefined zones, areas, etc.

At block 608, it is determined whether the mobile computing device is physically located within a predefined area (e.g., demarcated zone 502), which may include a predetermined distance from a device (e.g., predetermined distance 412) based on the physical location of the mobile computing device determined at block 606. When the mobile computing device is indeed located within the predefined area, at block 610, information to and/or capability on the mobile computing device may be provided for performing or completing the requested transaction or service. If the mobile computing device is not within the predefined area, then the transaction or service is not performed, thereby ensuring that the transaction or service is not performed for an unauthorized user.

It may be understood that the blocks illustrated in FIG. 6 are not limited to any specific order. One or more of the blocks may be performed or executed simultaneously or near simultaneously.

Figure 7:
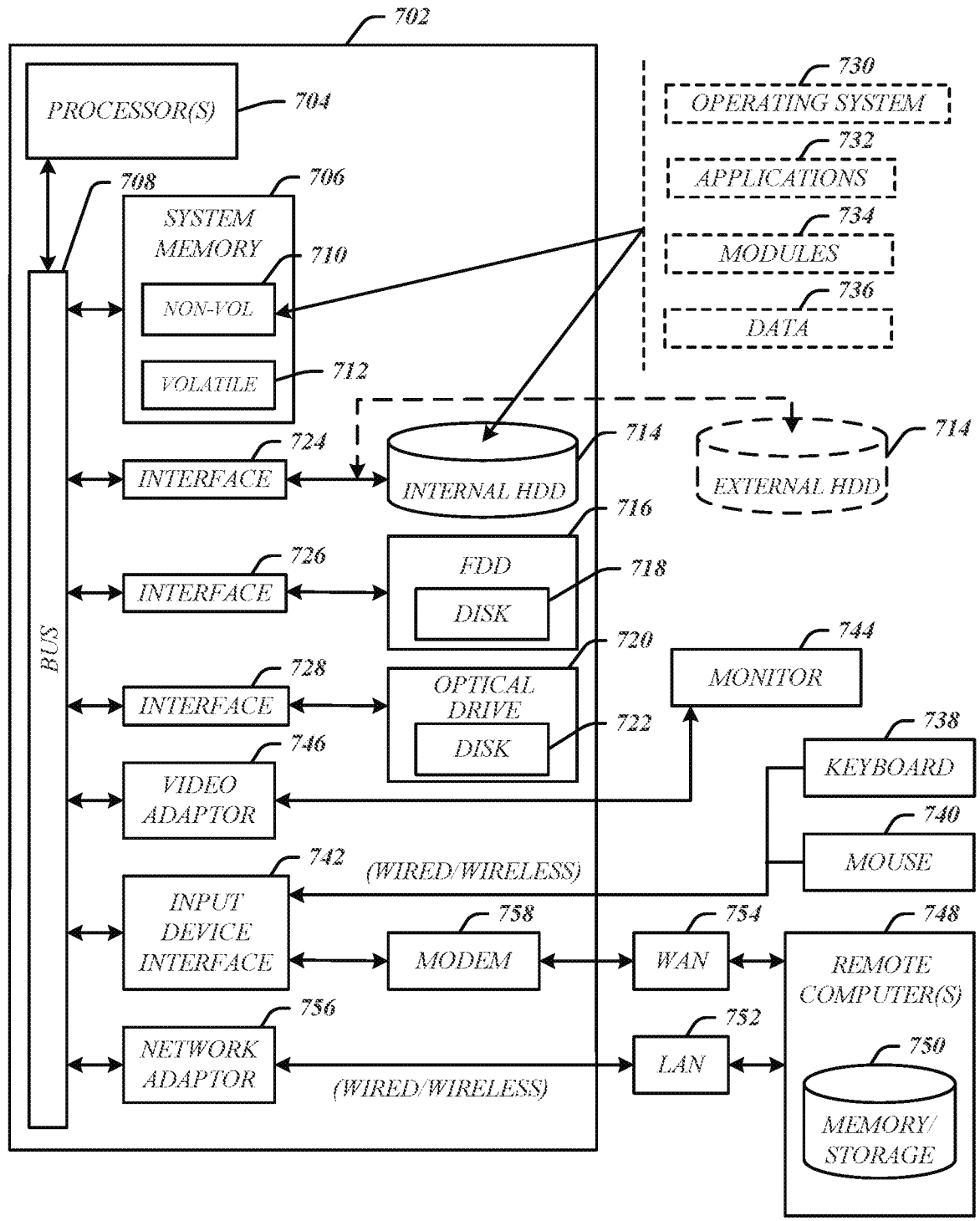
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, the computing device and/or the processing circuitries thereof may be configured to at least execute and support the authentication, identification, and localization of a mobile computing device using a mesh network. It may be understood that the computing device and/or the processing circuitries may be configured as backend server computers configured to perform the identification and localization, may be configured as the short-range mesh network nodes, or any other computing device that is configured to support, or execute any of the features, functionalities, descriptions described anywhere herein.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writable or re-writable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
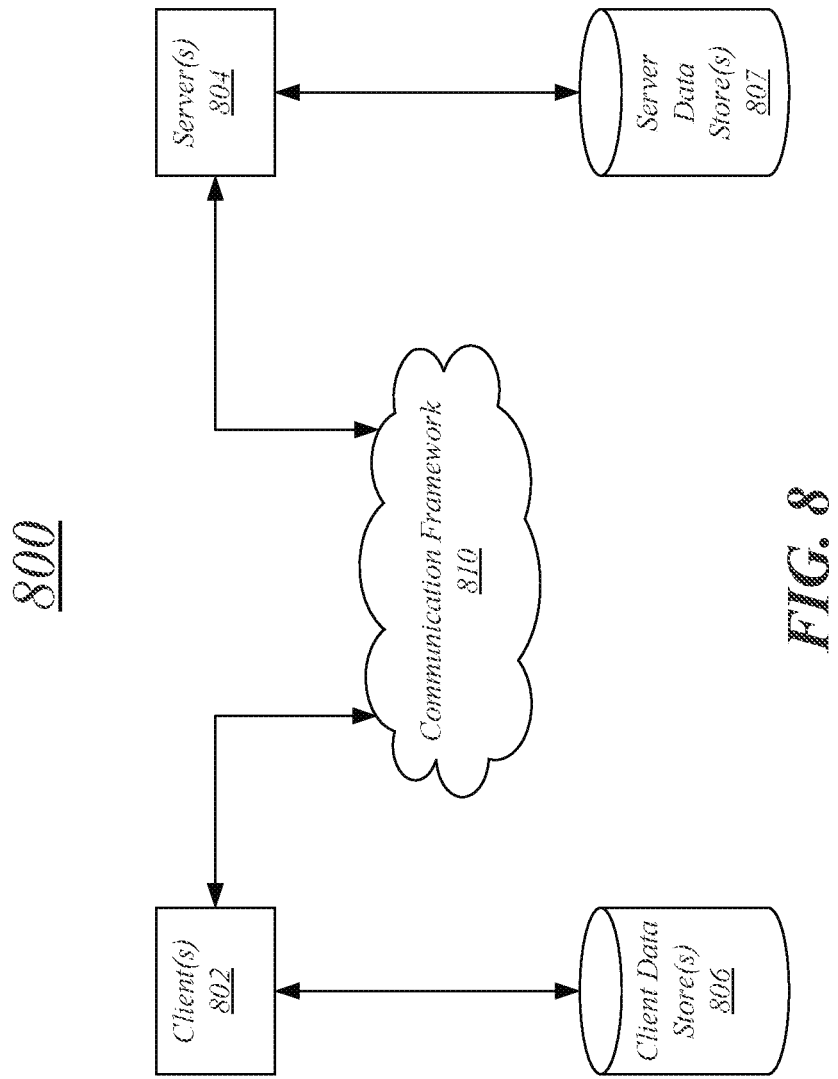
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least one computing devices connected to the network may be a user mobile computing device, such as a smartphone, laptop, tablet computer, etc. At least a second computing device connected to the network may be one or more server computers, which may be implemented as a back-end server or a cloud-computing server.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
processing circuitry operable to execute stored instructions that, when executed, cause the processing circuitry to:
receive, from a server, an indication of a transaction;
determine that a computing device is connected to one or more mesh nodes of a plurality of mesh nodes of a mesh network, wherein each mesh node comprises a sensor and a directional antenna;
determine a location of the computing device by:
determining the computing device is connected to a first mesh node of the plurality of mesh nodes,
determining information associated with the first mesh node, the information being communicated and shared among the remaining plurality of mesh nodes,
determining a signal direction of a respective signal received from the computing device, wherein the respective signal is measured via the directional antenna of the respective mesh node of the plurality of mesh nodes,
determining a respective signal strength of the respective signal received from the computing device, wherein the signal strength is measured via the directional antenna of the respective mesh node, and
triangulating the location of the computing device via the determined directions of the signals, and
determining the location of the computing device based on the triangulation, the determination that the computing device is connected to the first mesh node, the determined signal directions, and the determined signal strengths;
determine the location of the computing device is at or within a predetermined distance of the apparatus; and
automatically process the transaction based on the determination that the location of the computing device is at or within the predetermined distance of the apparatus.

2. The apparatus of claim 1, wherein the processing circuitry is further caused to determine the location of the computing device by determining the first mesh node has the greatest measured signal strength relative to the other measured signal strengths.

3. The apparatus of claim 1, wherein the apparatus comprises an automated teller machine (ATM), and wherein a location of the ATM is known relative to respective locations of the mesh nodes.

4. The apparatus of claim 3, wherein the sensors are arranged (i) adjacent to the ATM or (ii) on or in the ATM.

5. The apparatus of claim 1, wherein the mesh nodes are arranged in: (i) a ring configuration, (ii) a rectangular configuration, (iii) a triangular configuration, or (iv) a polygonal configuration.

6. The apparatus of claim 1, wherein the plurality of mesh nodes includes a fixed mesh node or a mobile mesh node.

7. A method comprising:
receiving, by a device, an indication of a transaction from a server;
determining that a computing device is connected to one or more mesh nodes of a plurality of mesh nodes of a mesh network, wherein each mesh node comprises a sensor and a directional antenna;
determining a location of the computing device by:
determining the computing device is connected to a first mesh node of the plurality of mesh nodes,
determining information associated with the first mesh node, the information being communicated and shared among the remaining plurality of mesh nodes,
determining a signal direction of a respective signal received from the computing device, wherein the respective signal is measured via the directional antenna of the respective mesh node of the plurality of mesh nodes,
determining a respective signal strength of the respective signal received from the computing device, wherein the signal strength is measured via the directional antenna of the respective mesh node, and
triangulating the location of the computing device via the determined directions of the signals, and
determining the location of the computing device based on the triangulation, the determination that the computing device is connected to the first mesh node, the determined signal directions, and the determined signal strengths;
determining the location is at or within a predetermined distance from the device; and
automatically processing, by the device, the transaction based on the determination that the location of the computing device is at or within the predetermined distance from the device.

8. The method of claim 7, wherein a location of the device is known relative to respective locations of mesh nodes.

9. The method of claim 8, wherein the device is an automated teller machine, a kiosk, a vending machine, a gas pump, or a security checkpoint device.

10. The method of claim 7, wherein the sensors are arranged (i) adjacent to an automated teller machine (ATM) or (ii) on or in the ATM.

11. The method of claim 7, wherein the mesh nodes are arranged in: (i) a ring configuration, (ii) a rectangular configuration, (iii) a triangular configuration, or (iv) a polygonal configuration.

12. The method of claim 7, wherein the plurality of mesh nodes includes a fixed mesh node or a mobile mesh node.

13. The method of claim 7, wherein the server authenticates an account via the computing device, wherein the transaction is associated with the account, wherein the server receives the indication of the transaction from the computing device subsequent to the authentication.

14. A non-transitory computer-readable storage medium storing computer-readable program code executable by a processor to:
receive, from a server, an indication of a transaction;
determine that a computing device is connected to one or more mesh nodes of a plurality of mesh nodes of a mesh network, wherein each mesh node comprises a sensor and a directional antenna;

determine a location of the computing device by:
  determining the computing device is connected to a first mesh node of the plurality of mesh nodes,
  determining information associated with the first mesh node, the information being communicated and shared among the remaining plurality of mesh nodes,
  determining a signal direction of a respective signal received from the computing device, wherein the respective signal is measured via the directional antenna of the respective mesh node of the plurality of mesh nodes,
  determining a respective signal strength of the respective signal received from the computing device, wherein the signal strength is measured via the directional antenna of the respective mesh node, and
  triangulating the location of the computing device via the determined directions of the signals, and
  determining the location of the computing device based on the triangulation, the determination that the computing device is connected to the first mesh node, the determined signal directions, and the determined signal strengths;

determine the location of the computing device is at or within a predetermined distance of a device; and automatically process the transaction based on the determination that the location of the computing device is at or within the predetermined distance of the device.

15. The non-transitory computer-readable storage medium of claim 14, wherein a location of the device is known relative to respective locations of the mesh nodes.

16. The non-transitory computer-readable storage medium of claim 15, wherein the sensors are arranged adjacent to the device.

17. The non-transitory computer-readable storage medium of claim 15, wherein the device is in a store, a mall, an airport, a concert venue, a building, an office, or a room.

18. The non-transitory computer-readable storage medium of claim 14, wherein the mesh nodes are arranged in: (i) a ring configuration, (ii) a rectangular configuration, (iii) a triangular configuration, or (iv) a polygonal configuration.

19. The non-transitory computer-readable storage medium of claim 14, wherein the plurality of mesh nodes includes a fixed mesh node or a mobile mesh node.

20. The non-transitory computer-readable storage medium of claim 14,
  wherein the device is an automated teller machine (ATM), and
  wherein a location of the ATM is known relative to respective locations of the mesh nodes.

* * * * *